May 23, 1939.                    C. E. COOK                    2,159,842
METHOD OF FABRICATING DETACHABLE DRILL BITS
Filed Sept. 23, 1937                    2 Sheets—Sheet 1
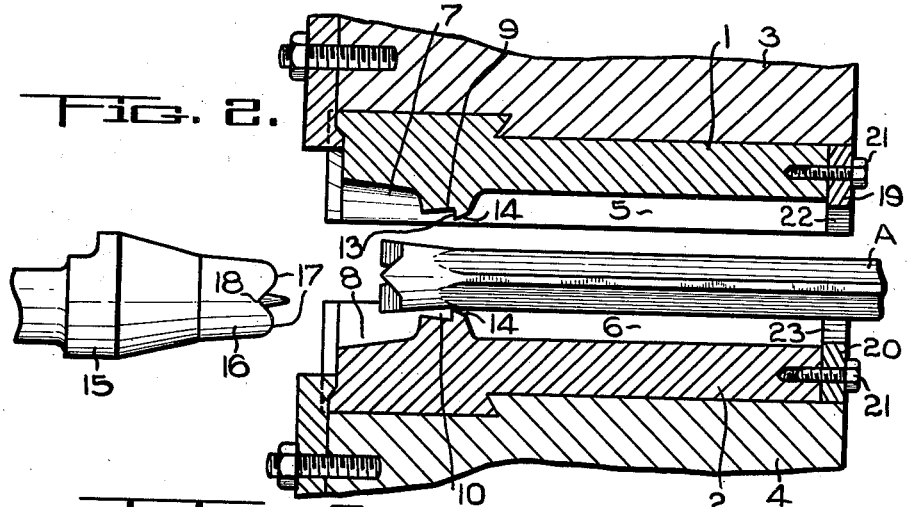
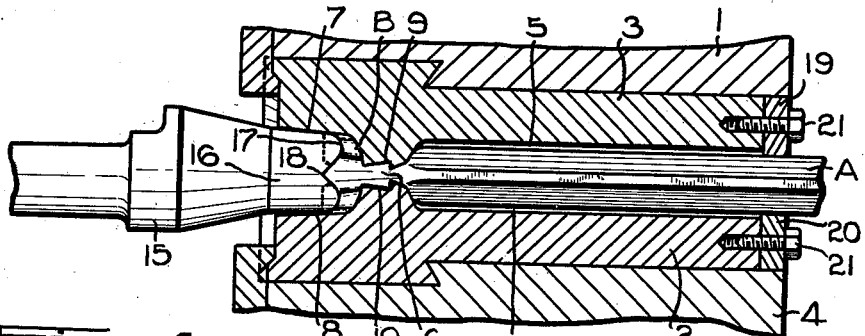
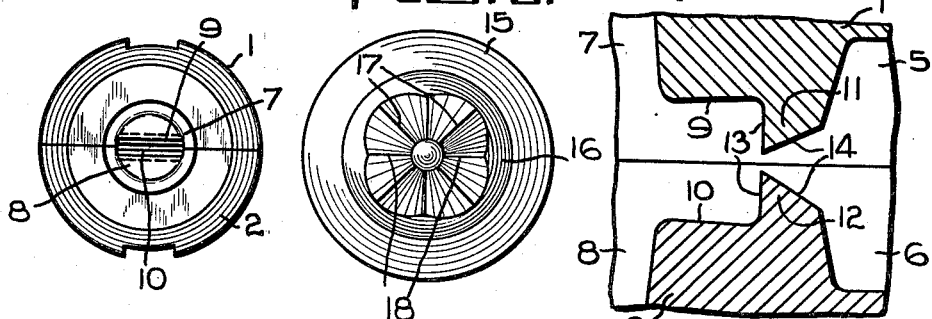
Inventor
C. E. COOK
By J. E. M. Featherstonhaugh
Attorney May 23, 1939.   C. E. COOK   2,159,842
METHOD OF FABRICATING DETACHABLE DRILL BITS
Filed Sept. 23, 1937   2 Sheets-Sheet 2
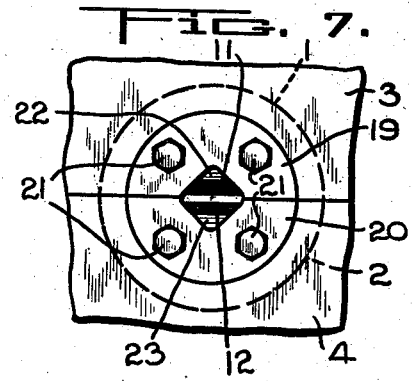
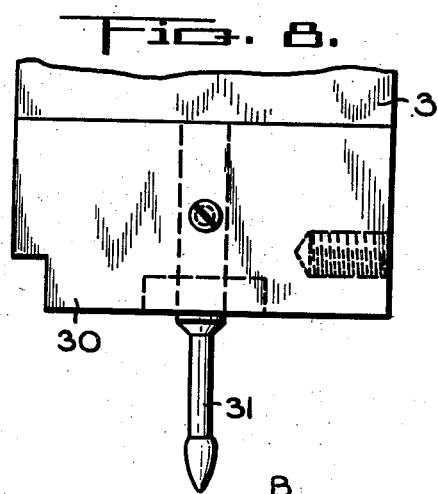
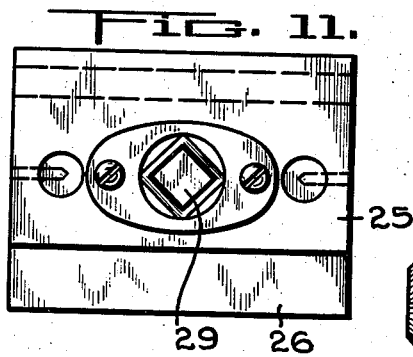
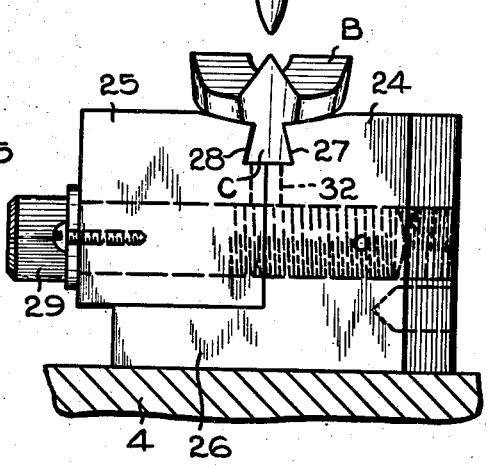
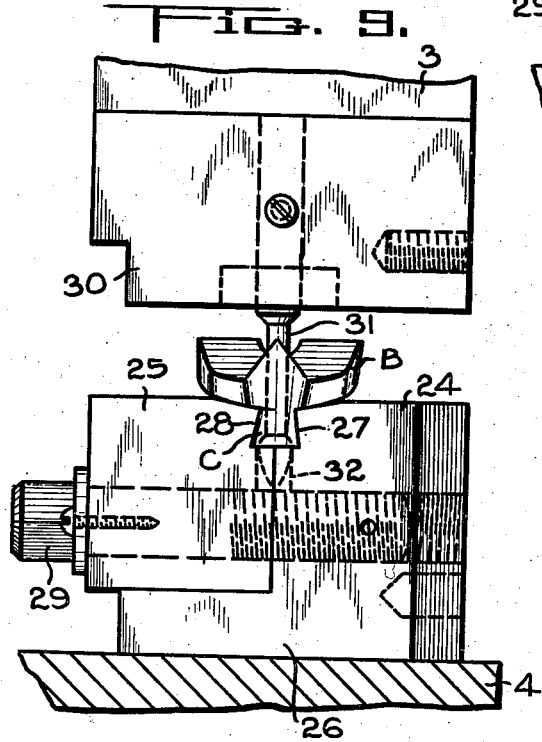
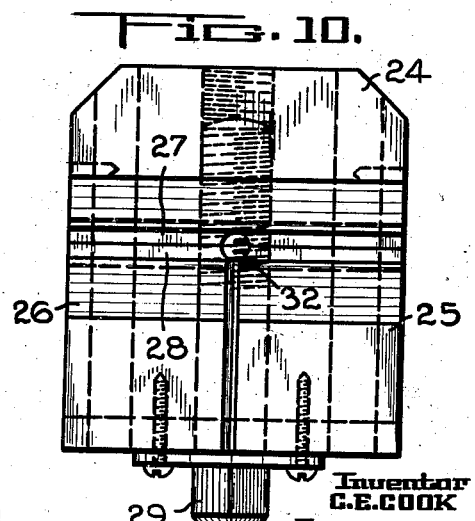

Patented May 23, 1939

2,159,842

UNITED STATES PATENT OFFICE 2,159,842

METHOD OF FABRICATING DETACHABLE DRILL BITS

Charles Edward Cook, South Porcupine, Ontario, Canada, assignor to International Detachable Bits & Equipment, Limited, Timmins, Ontario, Canada, a corporation of Ontario, Canada Application September 23, 1937, Serial No. 165,242

3 Claims. (Cl. 76—108)

My invention relates to improvements in methods of fabricating detachable drill bits and an object of the invention is to devise a method which may be carried out in the steel shops of mines with their usual equipment.

A further object is to evolve a method in which the detachable drill bit will be fabricated entirely by forging operations and no machining of the bit, which entails the use of expensive machines such as millers, broaches or grinders and skilled labour, will be necessary.

A still further object is to devise a method which will economize steel both in the actual manufacture of the bit and by the avoidance of wastage of the drill steel stock from which the bits are made.

I will now describe the making of a detachable drill bit by my method and, by way of example, such bit will be described as one with a dovetail tongue for connection to a shank such as is disclosed in United States Patent No. 2,030,576 issued February 11, 1936, and to the manufacture of which my method is particularly applicable.

In the attached drawings:

Fig. 1 represents a side view of a drill steel stock or bar having previously had the cutting edges of the bit roughly formed on an end thereof by conventional methods.

Fig. 2 is a vertical longitudinal section through a divided forming and clamping die in which the drill steel stock or bar is adapted to be disposed showing in elevation the dolly for dollying the bit to be formed, the upper portion of the die being retracted.

Fig. 3 is a similar view to Fig. 2 only showing the divided forming and clamping die closed with the drill steel stock disposed therein and cutting knives incorporated in the die having partially severed the drill steel stock so that a detachable drill bit is formed on the end thereof, the dolly being shown in elevation dollying the bit thus formed.

Fig. 4 is an end view of the divided forming and clamping die viewed from the dolly receiving end and in the closed position illustrated in Fig. 3.

Fig. 5 is an enlarged fragmentary vertical section through the portions of the die as illustrated in Fig. 2 showing the means therein for partially severing the drill steel stock.

Fig. 6 is an enlarged end view of the dolly.

Fig. 7 is an end view of the divided forming and clamping die viewed from the opposite end to that shown in Fig. 4.

Fig. 8 is a side view of the means for punching the axial water hole in the fabricated detachable drill bit, showing such means in the initial position.

Fig. 9 is a similar view to Fig. 8 only showing such means in the position wherein the water hole has been punched through the bit, and Figs. 10 and 11 are respectively a top plan and end view of the detachable drill bit supporting means incorporated in the punching means.

Like characters of reference indicate corresponding parts in the different views of the drawings.

In carrying out my method I take a heated drill steel stock or bar A (which has previously had the cutting edges of the bit formed on the end thereof by a conventional method) as illustrated in Fig. 1 and place it between the upper and lower portions 1 and 2 of a divided forming and clamping die as shown in Fig. 2.

The upper portion 1 of the die is attached to the ram 3 of a conventional drill steel sharpener and the lower portion is mounted on the lower die block 4 thereof.

An axial bore for receiving the drill steel stock A extends through the divided clamping die from the end remote from the end wherein the dollying operation occurs and such axial bore is constituted by registering longitudinal recesses 5 and 6 in the coacting faces of the die portions 1 and 2. A conical axial recess is formed in the dollying end of the divided forming and clamping die being constituted by registering recesses 7 and 8 in the coacting faces of corresponding ends of the portions 1 and 2. Such conical recess supports the detachable drill bit B formed from the drill steel stock as will hereinafter appear.

In the case where the detachable drill bit to be fabricated is to have a dovetail tongue thereon, which is the form of bit illustrated, a recess of dovetail cross-section extends inwardly longitudinally from the base of the conical recess and is formed by registering recesses 9 and 10 in the coacting faces of the die portions 1 and 2.

Registering cutting knives 11 and 12 are formed on the coacting faces of the portions 1 and 2 and preferably one face 13 of each knife which is also preferably the end wall of the dovetail recess in the clamping die is perpendicular to the longitudinal axis of the die and the other face 14 is disposed at an angle thereto so that when the bit B formed from the end of the drill steel stock A is subsequently broken off from the stock, the fracture will occur close to the end of the dovetail tongue C thus obviating the necessity of any machining of such end. Such construction is clearly illustrated in Fig. 5 of the drawings, and it is to be understood that such knives 11 and 12 do not come into contact with each other; consequently, the drill steel stock A is only partially sheared through.

Referring again to Fig. 2 of the drawings it will be seen that the ram 3 of the drill steel sharpener and its attached die portion 1 are retracted and upon the drill steel stock A being placed between the portions 1 and 2 as illustrated the ram 3 is brought down so that the upper die portion 1 is in substantial engagement with the lower die portion 2 with the result that the detachable drill bit B with its dovetail tongue C is formed on the end of such drill steel stock A.

With the stock A and its attached detachable drill bit B still clamped between the portions 1 and 2 of the divided die, the cutting surface of the bit B is now dollied by the reciprocable dolly 15 which is mounted in and actuated by the dollying attachment (not shown) of the drill steel sharpener. The axis of such dolly 15 is coincident with the longitudinal axis of the divided die and the bit therein. The nose 16 of the dolly is provided with points 17 and valleys 18 corresponding with the valleys and points of the cutting surface of the bit so that when the latter is dollied by the dolly its cutting edges are sharpened and the bit is gauged.

The construction of the divided clamping die is such that the drill steel stock or bar A, when placed in the die, is automatically aligned with the dolly points and with respect to the dovetail C. This is achieved by means of the semi-circular plates 19 and 20 secured respectively to the ends of the portions 1 and 2 of the die remote from the end wherein the dolly enters by screw bolts 21. The coacting faces of the plates 19 and 20 have notches 22 and 23 which together form an aperture corresponding to the cross-sectional shape of the drill steel stock A, and support the stock in proper alignment.

The bit B having now been completed the dolly 15 is retracted and the upper portion 1 of the forming and clamping die is moved upwardly away from the lower portion 2 by actuating the ram 3. The drill steel stock A with the attached bit B on the end thereof is removed from the die. It will be observed that the knives 11 and 12 have very nearly severed the bit B from the stock A only a small neck being left therebetween. By striking the bit transversely with a hand hammer it may be completely severed from the stock.

The end of the remainder of the stock A is ground square and the above method repeated to fabricate the next bit.

It now remains to make an axial orifice or water hole through the bit. This would ordinarily be accomplished by drilling the bit but by my method I reheat the bit which, of course, has retained considerable of its original heat and place it upright between the stationary and movable jaws 24 and 25 of a vise member 26 mounted on the lower die block 4 of the drill steel sharpener. When holing a detachable bit having a dovetail tongue C as illustrated I insert and clamp the tongue between the semi-dovetail grooves 27 and 28 in the stationary and movable jaws 24 and 25 by tightening up the vise screw 29.

A punch holder 30 is mounted on the ram 3 into which a vertical punch 31 in inserted disposed so that upon the ram 3 being moved downwardly an axial hole will be punched through the bit as illustrated in Fig. 9, the tip of the punch being received into an orice 32 formed between the coacting jaws of the stationary and movable jaws 24 and 25.

The detachable drill bit is now removed from the vise and hardened when it is ready for use.

From the above description it will be apparent that I have devised a method for fabricating detachable drill steel bits which will be applicable for use in the steel shops of mines and with their existing machines. Such method will further effect savings in the consumption of steel, in the fuel for heating the same and in the labour cost as well as in equipment.

Although I have described and illustrated the bit fabricated by my method as being of the dovetail tongue type, it is obvious that by changing the configuration of the interior of the bit forming end of the clamping die detachable drill bits of several different construction can be fabricated by my method.

What I claim as my invention is:

1. A method of forming detachable drill bits which consists in forging the end portion of a heated drill steel stock which has previously had the bit cutters roughly formed on its extremity into the form of a detachable drill bit, simultaneously partially severing the bit formed from the remainder of the stock, dollying the bit to sharpen the cutters and gauge the bit, severing the formed bit completely from the remainder of the stock, and by a subsequent punching operation punching an axial hole through the bit.

2. A method of forming detachable drill bits of the type wherein a dovetail tongue is provided thereon for connection to a shank which consists in forging in a single pass the end portion of a heated drill steel stock which has previously had the bit cutters roughly formed on its extremity into the form of a detachable drill bit including the dovetail tongue, dollying the cutters of the formed bit to sharpen them, severing the dovetail tongue of the formed bit from the remainder of the stock, and by a subsequent punching operation punching an axial hole through the bit including its dovetail tongue.

3. A method of forming detachable drill bits of the type wherein a dovetail tongue is provided thereon for connection to a shank which consists in forging the end portion of a heated drill steel stock which has previously had the bit cutters roughly formed on its extremity into the form of a detachable drill bit including the dovetail tongue, simultaneously partially severing the dovetail tongue of the formed bit from the remainder of the stock, dollying the bit to sharpen the cutters and gauge the bit, severing completely the dovetail tongue of the formed bit from the remainder of the stock, and by a subsequent punching operation punching an axial hole through the bit including its dovetail tongue.

CHARLES EDWARD COOK.